United States Patent [19]

McGrane

[11] Patent Number: 4,547,627
[45] Date of Patent: Oct. 15, 1985

[54] TRANSFORMER BAR CONNECTOR AND PEDESTAL BAR CONNECTOR COVER

[75] Inventor: Eugene W. McGrane, Ormond Beach, Fla.

[73] Assignee: Homac Mfg. Company, Ormond Beach, Fla.

[21] Appl. No.: 665,890

[22] Filed: Oct. 29, 1984

Related U.S. Application Data

[63] Continuation-in-part of Ser. No. 515,237, Jul. 19, 1983, Pat. No. 4,513,169.

[51] Int. Cl.$^4$ ............................................. H01R 13/44
[52] U.S. Cl. ................................. 174/138 F; 339/242; 339/272 A
[58] Field of Search ................... 174/5 R, 138 F, 145; 339/116 R, 116 C, 198 J, 242, 272 R, 272 A

[56] References Cited

U.S. PATENT DOCUMENTS 3,983,314  9/1976  Filhaber ..................... 339/272 A X Primary Examiner—Laramie E. Askin
Attorney, Agent, or Firm—John E. Benoit

[57] ABSTRACT

A protective cover is provided for a standard rectangular transformer connector bar and for pedestal bar connector having ports for cable installation and threaded boreholes in adjacent ninety degree planes. The cover comprises a translucent housing open at one end and closed at the other when used with the transformer bar connector, and closed at both ends when used as a pedestal bar connector. The cover has a plurality of internal aligning ribs having apertures therein which allow longitudinal passage of the connector bar therethrough. A plurality of parallel access ports through the housing extend longitudinally and are spaced from each other ninety degrees so as to be alignable with the installation ports and boreholes of the bar connector. Opposed flexible tines extend across each of the access ports from the edges thereof. The apertures in the ribs are geometrically configured so as to align the access ports with the installation ports and boreholes of the transformer connector bar for either a right-hand or left-hand installation of the connector bar on the transformer stud.

2 Claims, 11 Drawing Figures

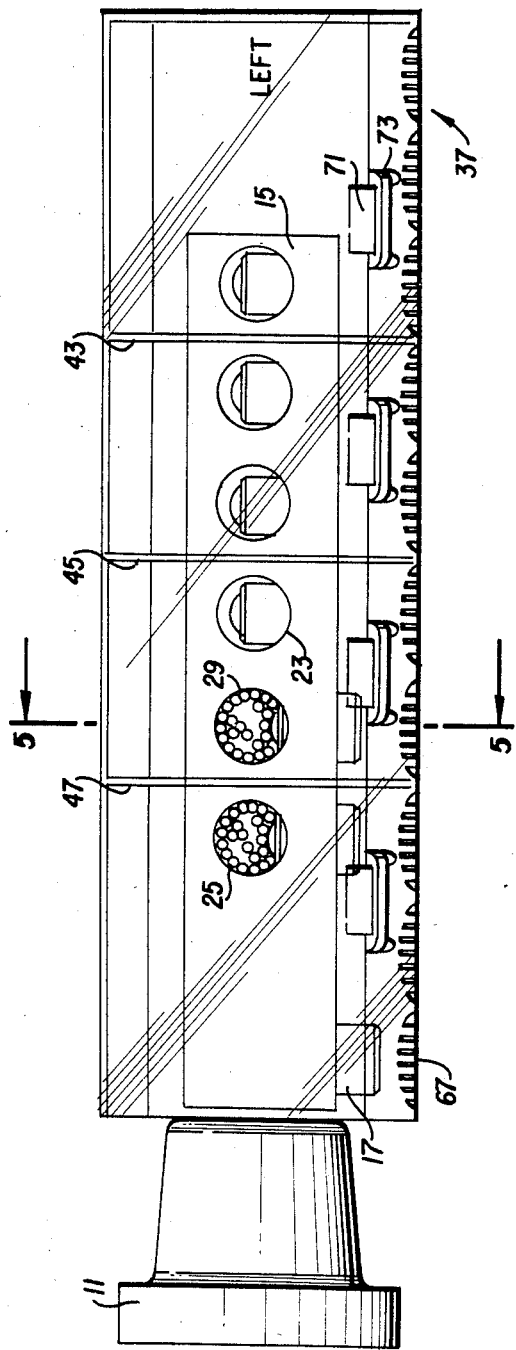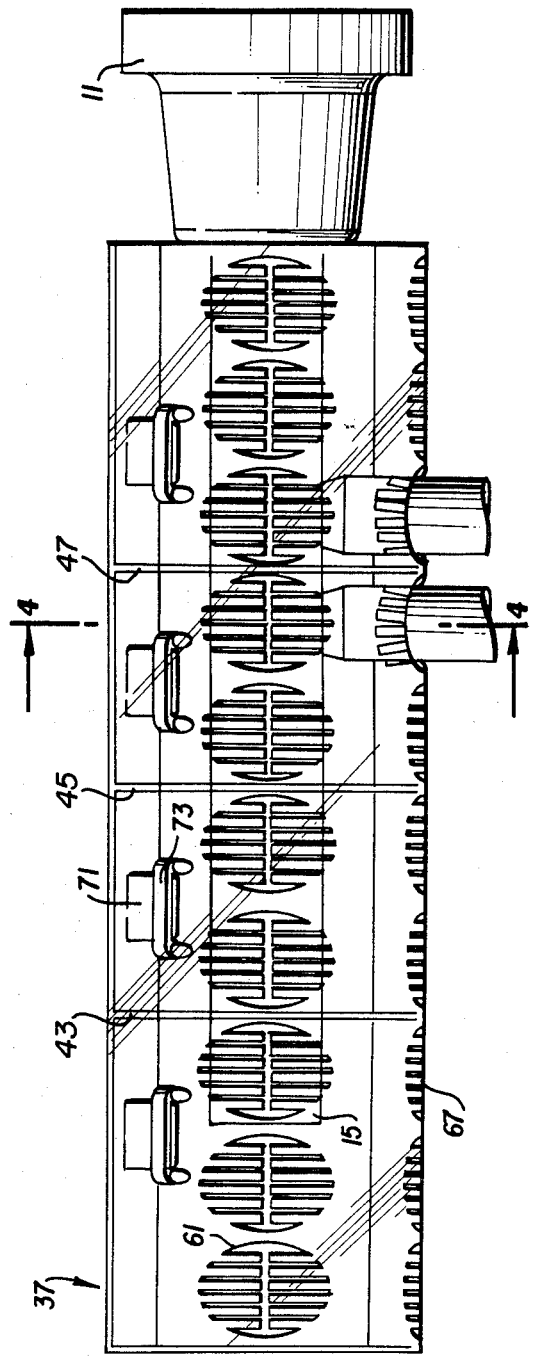

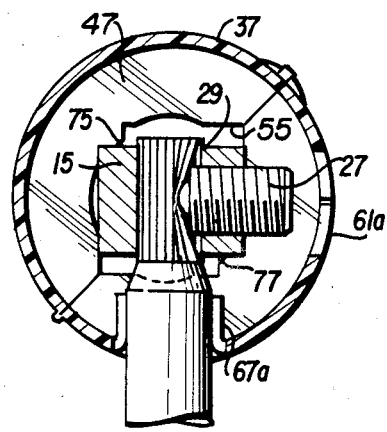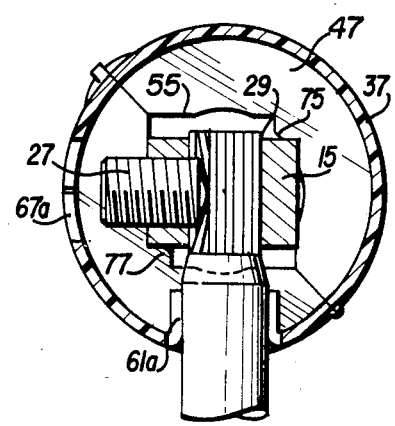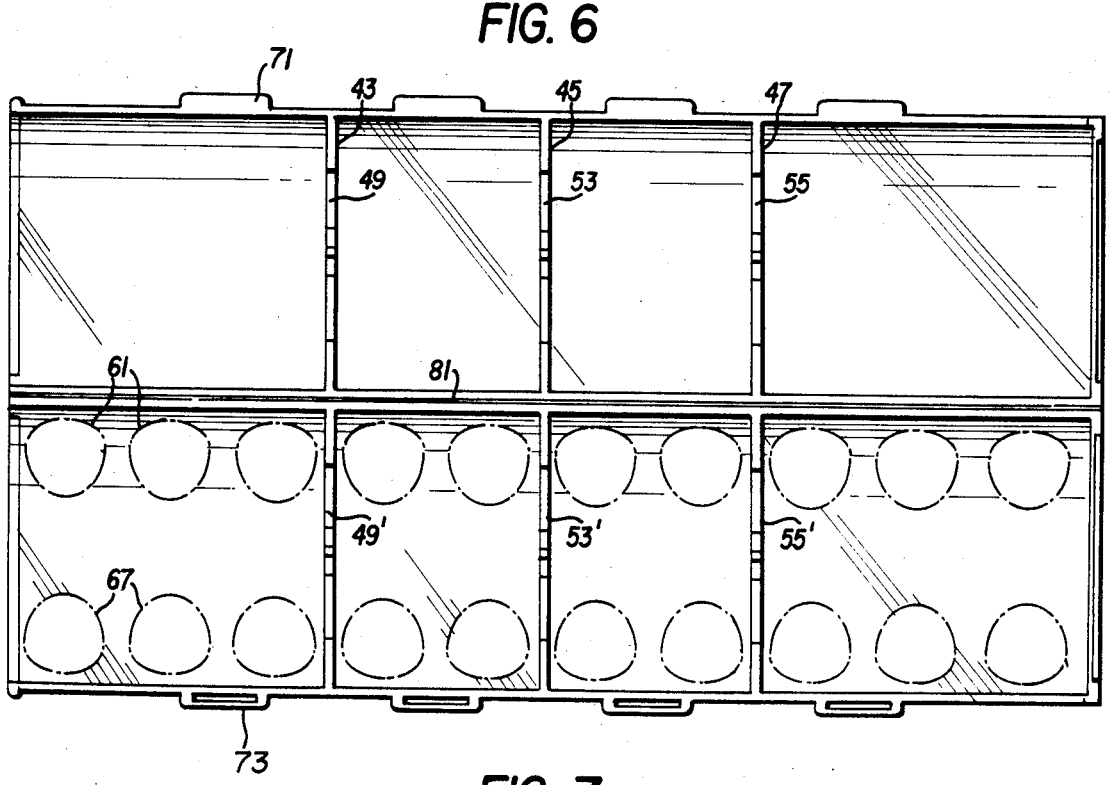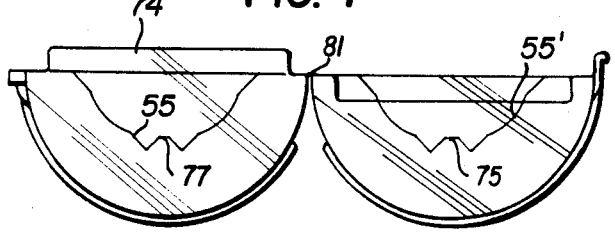

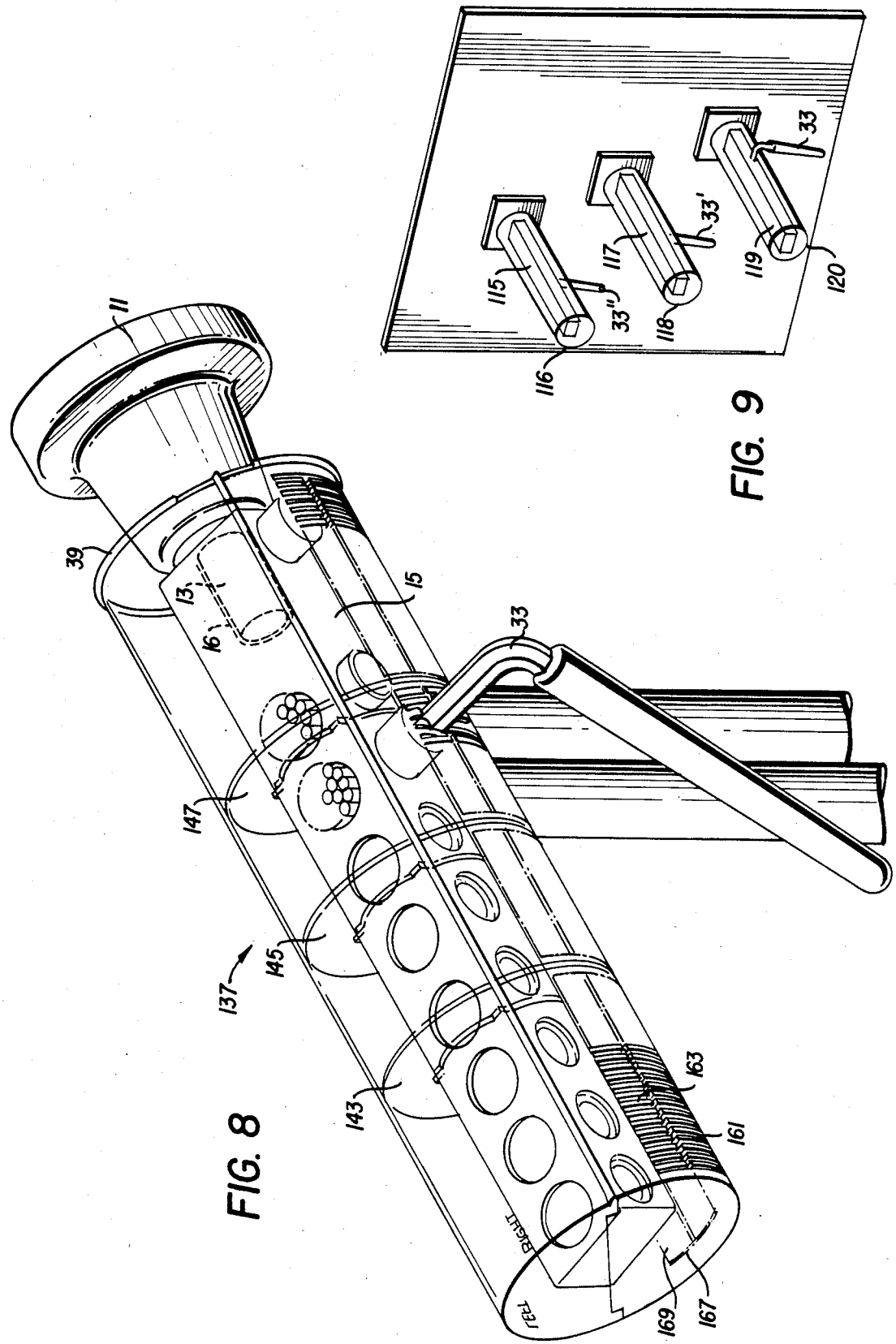

TRANSFORMER BAR CONNECTOR AND PEDESTAL BAR CONNECTOR COVER

This application is a continuation-in-part of application Ser. No. 515,237, now U.S. Pat. No. 4,513,169 filed July 19, 1983.

This application relates generally to insulators for transformer stud bar connectors and more specifically to an insulator cover which is for installation about a transformer stud bar connector or about a pedestal bar connector.

BACKGROUND OF THE INVENTION

In electrical utility underground residential wiring, common practice uses transformers supplied with secondary voltage bushings that include insulators with threaded studs. The threaded studs are provided to energize service and distribution cables through electrical connectors designed for assembly to them. Additionally, pedestal bar transformers are also used in underground residental wiring.

Where a multiplicity of cables are to be energized by the studs, a standard rectangular bar connector, machined on one end to provide a threaded borehole for assembly to the threaded stud, and providing electrical connections in the desired number, is commonly used.

Two types of connections are normally made to the secondary bushing stud. The first type is a threaded fit, wherein the connector is machined on one end to provide a threaded borehole with the same threading as the transformer stud. During assembly, the bar connector is threaded onto the stud and locked in position by a lock nut.

The other normal type of connection made to secondary bushing studs allows for the installation and the removal of the bar connector from the stud without disassembly of installed cables. The bar connector has a larger diameter threaded hole than the secondary bushing stud. However, the pitch of the threads in the bar connector is identical to that of the stud. This identical threading provides areas of inter-thread contact for current transfer from the stud to the connector. The bar is positioned on the stud and secured with a set screw.

Connectors used in residential underground construction are normally insulated. In some applications, where flooding of the transformer enclosure is common, water-tight connector assemblies are required.

A more common requirement in the above environment is that connections be insulated only to protect the lineman in wiring to the transformer initially and during subsequent maintenance. This arrangement is commonly described as dead front construction.

While some transformers have two adjacent studs, they are more normally provided with three angularly aligned bushings and associated studs. Due to space limitations, it is desirable to place the bar connector on the stud so that the wrench will have access to the set screws on the side of each bushing which presents the greatest clearance for the lineman. This is referred to as right- and left-hand installation.

The insulating cover of the present invention satisfies all of the requirements for dead front construction while introducing new features that provide convenience of assembly, allow for visual inspection of connections after assembly, reduce installing time, and promote safety.

Additionally, the same type of protection is provided when the lineman is installing or otherwise working on pedestal bar connectors.

Further objects of the invention include
1. An insulator cover for a transformer bar connector, or a pedestal bar connector, which is configured to prevent brush contacts.
2. An insulator cover which includes common access ports for both cable installation and for the tightening of the set screws.
3. An insulator cover which includes access ports and means therein for temporarily restraining the cables in a fixed position during visual inspection prior to the securing of the set screws.
4. An insulator cover including access ports having retaining means for restraining tools, such as a wrench, being used for tightening the set screws so that if the wrench is released it will not drop free.
5. An insulator cover which has at least two access ports spaced 90° from each other so as to provide for right- and left-hand installation.
6. An insluator cover for providing dead front protection on existing bare connector installations irrespective of cable outlet spacing.

These and other objects of the invention will become apparent from the following discussion taken together with the drawings.

BRIEF DESCRIPTION OF THE DRAWINGS

FIG. 2 is a top plan view showing the cover in place for left-hand installation;

FIG. 3 is a side elevational view showing the cover in place for a right-hand installation as shown in FIG. 1;

FIG. 4 is a sectional view taken through the lines 4-4 of FIG. 3;

FIG. 5 is a sectional view taken through the lines 5-5 of FIG. 2;

FIG. 6 is a plan view of the cover after being removed from the mold prior to being factory assembled as shown in FIG. 1;

FIG. 7 is an end view of the cover illustrated in FIG. 6.

FIG. 8 is a modification of the cover of FIG. 1;

FIG. 9 is a perspective view of the covers of the present invention in place on a plurality of angularly aligned transformer studs;

SUMMARY OF THE INVENTION

The present invention provides a protective cover for a standard elongated transformer connector bar and a pedestal bar connector having ports for cable installation and threaded boreholes in adjacent 90° planes. The cover comprises a translucent housing open at one end and closed at the other end when used with a transformer bar connector and closed at both ends when used as a pedestal bar connector cover. The cover has a plurality of internal aligning ribs having apertures therein which allow longitudinal passage of the connector bar therethrough. Parallel access ports extend longitudinally and through the housing and are spaced from each other 90° so as to be alignable with the installation ports and the boreholes of the bar connector. Opposed flexible tines extend across each of the access ports from the edges thereof. The apertures and the ribs are geometrically configured so as to align the access ports with the installation ports and the boreholes of the connector bar for either right-hand or left-hand installation of the connector bar on a transformer stud.

DETAILED DESCRIPTION OF THE INVENTION

Figure 1:
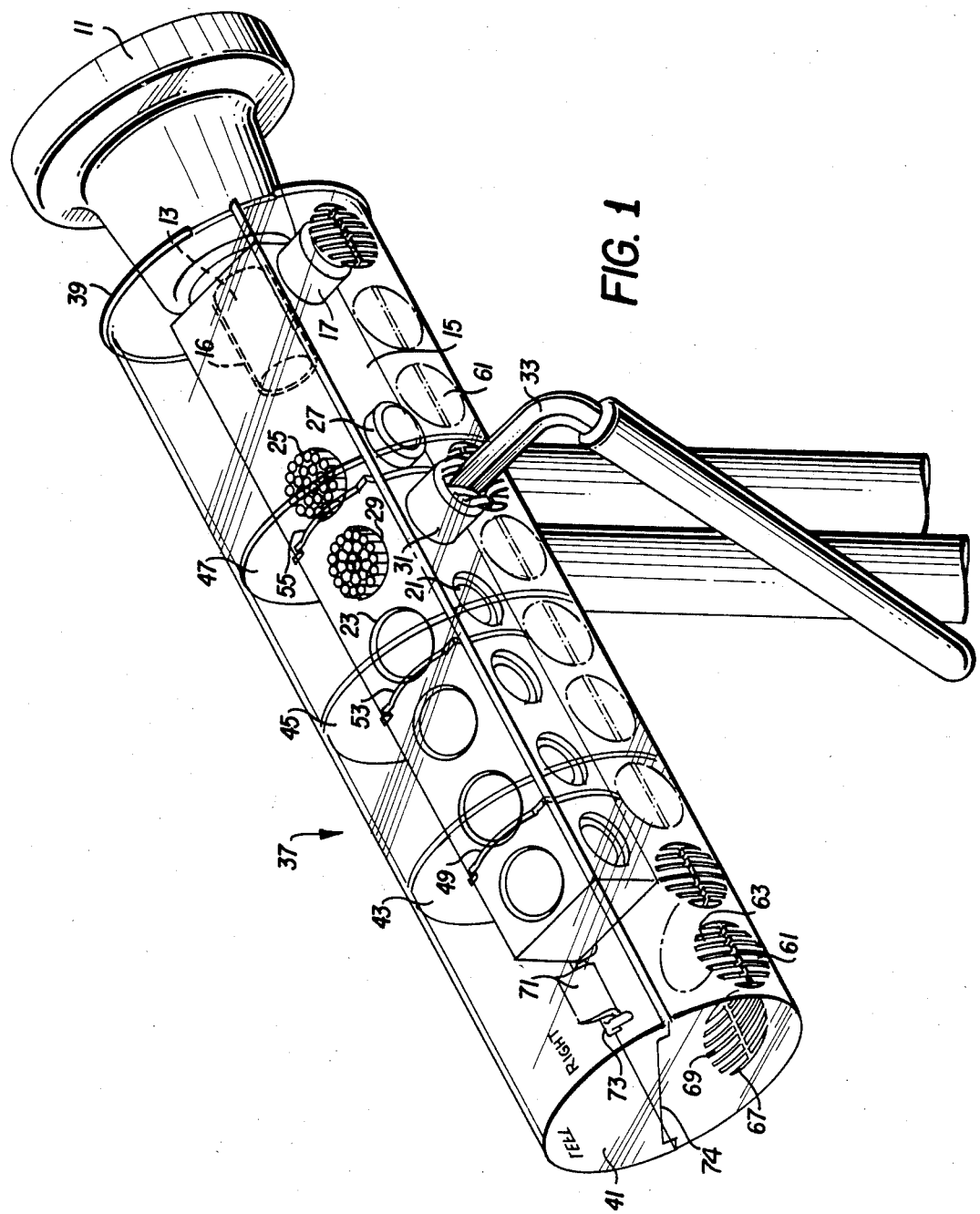
FIG. 1 is a perspective view of one embodiment of the cover of the present invention in place on a transformer bar connector during installation.

Turning now to FIG. 1, which illustrates one embodiment of the present invention, there is shown a transformer insulator bushing 11 having a threaded transformer stud 13. A bar connector 15 is machined at one end so as to have a threaded borehole 16 which is larger than the threaded transformer stud. However, the internal threading of the borehole 16 is identical to the external threading of the transformer stud 13 so that contact is still maintained between the threadings at their respective bases so as to provide proper electrical current transfer. An internally threaded borehole accepts transformer stud locking screw 17 whereby connector 15 may be secured to transformer stud 13 in a well known manner.

The standard transformer bar connector is rectangular as shown in FIG. 1. However, it is to be understood that this invention would be compatible with any other geometrical configuration such as a square bar connector, that is, a connector wherein all sides are of an equal dimension. The standard bar connector has a plurality of threaded boreholes 21 which extend into the bar connector 15 and meet in centered alignment with the plurality of cable installation ports 23 which extend through the bar connector. In FIG. 1, cables 25 and 29 are shown in position in their respective installation ports. Set screw 27 has been secured so as to maintain cable 25 in position and, in the illustration, set screw 31 is being driven to a set position by wrench 33.

Translucent cover 37 comprises a housing open at one end 39 and closed at the other end 41. A plurality of alignment ribs 43, 45 and 47 are integral with housing 37 and extend transversely within the housing. Each of the alignment ribs includes apertures 49, 53 and 55 which will be described in more detail subsequently. These apertures are of a sufficient size to allow longitudinal passage of bar connector 15 therethrough.

In the periphery of the housing 37 is a row of access ports 61 which extend in longitudinal alignment substantially along the entire length of the housing. These access ports have a plurality of opposed flexible tines 63 which extend from the periphery of each of the access ports.

A second row of access ports 67, having opposed tines 69, also extends in longitudinal alignment along substantially the entire length of the housing. The first and second rows of access ports are substantially parallel and are peripherally spaced from each other substantially 90° for reasons which will become apparent as the description proceeds.

In order to provide a simplified method of manufacturing housing 37, it is comprised of two semicircular sections which are mated and held in place by means of tabs 71 which enter loops 73 when the sections are brought to a mating position. In order to assure proper mating, one of the sections includes shoulder 74 which fits into a corresponding indentation in the other mating section.

In a normal transformer construction, three transformer studs are available and exist in an adjacent relationship horizontally and vertically spaced from each other as will be discussed relative to FIG. 9. Accordingly, when the cables are placed in the bar connector, access is required so as to tighten the set screws with a wrench as is illustrated in FIG. 1. In order to be able to use this wrench on the preferred side of each transformer stud, it is desirable to be able to lock the bar connector in a position such that the threaded boreholes 21 face in the desired direction. Accordingly, it is desirable to secure the bar connector in what is termed a right- or left-hand assembly position. FIG. 1 illustrates the installation being performed for a right-hand installation. If the installation were to be made on a stud which is adjacent but beyond the connector stud as shown in FIG. 1, the bar connector would be rotated 180° so that the threaded boreholes 21 would be facing in the opposite direction. In order to make accommodation for such installation practice, the housing 37 is so designed that it may be placed upon the bar connector so that the access ports 61 and 67 will mate with corresponding installation ports and threaded boreholes in either position.

In order to assist the installer, the indicia "RIGHT" and "LEFT" appear as shown.

FIG. 2 illustrates the above concept in that it shows the installation procedure when the housing 37 is in position for a left-hand installation. In this position, the "LEFT" indicia will appear at the top of the housing. Accordingly, the designation which appears at the top of the housing indicates the proper position for such installation. The left-hand position illustrated in FIG. 2 is the opposite from that shown in FIG. 1. In this position, ports 67 are designed so as to accept the set screws whereas ports 61 now accept the cables.

FIG. 3 is a side elevational view of the installation shown in FIG. 1 wherein the cables enter access ports 67 and the set screws enter access ports 61. FIG. 4 is a sectional view taken through the lines 4—4 of FIG. 3 which illustrates that the housing 37 is in place and also illustrates the significance of apertures 49, 53 and 55 in alignment ribs 43, 45 and 47. In this installation, it can be seen that bar connector 15 is in place within aperture 55 with the cable passing through one of access ports 67 designated as 67a. Set screw 27 is in place and has passed through one of access ports 61 designated as 61a. Aperture 55 is basically a square aperture. If the bar connector were square in nature, that is, all sides being of an equal dimension, then the square geometrical configuration of the aperture would be sufficient to maintain the bar in proper position and to prevent rotation of the housing 37 once it is in place upon the bar. However, as pointed out above, the standard bar connector is rectangular for a number of reasons, one of which is to save on the amount of metal required. Whereas the cable installation boreholes only require a certain depth for cable installation, there must be a substantial depth for the boreholes 15 in order to properly thread them and to give the proper strength to the set screws when they are in place.

Since the housing is to be rotatably shifted, as will subsequently be more carefully explained, in order to provide for the right- and left-hand installation, provisions must be made relative to aperture 55 such that it will accept the bar connector in two positions. Accordingly, the basic dimensions must be of a sufficient size to accept the longer width of the rectangular bar connector in two positions. Therefore, in order to provide alignment and to prevent rotation, flanges 75 and 77 are provided. As can be seen, each flange includes intersecting edges which are substantially perpendicular to their adjacent sides of the aperture. It should also be noted that one of the flanges and the corner of the square in which it is located substantially bisects the angle between ports 67 and 61. This allows for rotation of the housing 37 relative to the bar connector 15 which in turn permits the above-discussed right-and left-hand installation.

FIG. 5 illustrates the cover in place for the left-hand installation. As can be seen, bar connector 15 has been rotated 180°. Housing 37 has been rotated 90° so that, in this position, the set screw enters access port 67a and the cable enters port 61a. The flanges 75 and 77, which are integral with the housing have also been rotated 90° relative to the position shown in FIG. 4 and provide the same securing function so as to prevent rotation of the housing. Accordingly, it can be seen that the cover of the housing of FIG. 1 is easily adaptable to either right or left-hand installation.

FIGS. 6 and 7 illustrate the preferred method of molding the cover. FIG. 6 is a plan view of the cover as it comes out of the mold showing access ports 61 and 67, tabs and loops 71 and 73 as well as alignment ribs 43, 45 and 47 and associated apertures 49, 53 and 55. The cover is molded so as to contain living hinge 81 between the two semi-circular sections, as is more clearly illustrated in FIG. 7, and the above-described alignment shoulder 74 and mating associated recess.

In addition to the applicability of the housing for use in either right- or left-hand installation, it should be noted that flexible tines 63 in access port 61 and tines 69 in access port 67 provide very definite functional purposes. The cables may be inserted into the installation ports 23 and temporarily restrained there by the flexible tines in order that a visual inspection may be made before the set screws are driven in place by the wrench. Further, these tines will temporarily restrain the wrench should the installer release it. This is highly important since the dropping of tools has resulted in various accidents as a result of the person reaching suddenly or grabbing for a tool which he has dropped. The wrench will not drop during installation time since it must be forceably removed from the tines. In the manufacturing process, the tines are of a dimension such that they may be made of the same material as the housing, but remain flexible so that they will subtantially return to their position when the cables are removed or when the wrenches are removed and still maintain a sufficient rigidity to perform the restraining functions discussed above.

FIG. 8 illustrates a modified embodiment of the cover illustrated in FIG. 1. The construction of the cover 137 is the same as in FIG. 1 with the exception of the access ports. In this embodiment, two substantially rectangular ports 161 and 167 extend the length of the cover and are interrupted only by ribs 143, 145 and 147. As in the cover of FIG. 1, the two ports are spaced from each other substantially 90°. Each of the ports has continuous tines 163 and 169.

The advantage of the cover illustrated in FIG. 8 is that bar connectors having any spacing of cable outlets and screw positions can be accommodated. It should be noted that three rows of access ports of either the type shown in FIG. 1 or FIG. 8 could be provided with rows spaced in 90° planes. Such a construction would allow installation of the bar from either a right or left hand plane. In other words, a row would be formed 180° from ports 61 of FIG. 1 or ports 161 of FIG. 8.

FIG. 9 illustrates the ability to use the cover for right or left-hand assembly and the advantage as to ease of installation and obvious safety provided thereby.

While some transformers have two adjacent studs, the most common configuration is a three stud arrangement as shown in FIG. 9. The studs are on an angle being displaced from each other both horizontally and vertically in order to conserve height. In the illustration, connectors 115, 117 and 119 are shown with covers 116, 118 and 120 in place. Although separate wrenches 33, 33' and 33" are shown, this is only to illustrate the right- or left-hand convenience of the present invention. Covers 116 and 118 and wrenches 33" and 33' are shown in the left-hand position as illustrated in FIG. 2. Cover 120 and wrench 33 are shown in the right-hand position as illustrated in FIGS. 1 and 3.

With the covers and connectors installed as illustrated in FIG. 9, the lineman will be working as safely as possible since the work is being done at the greatest distance possible between phases or from phase to ground.

Figure 10:
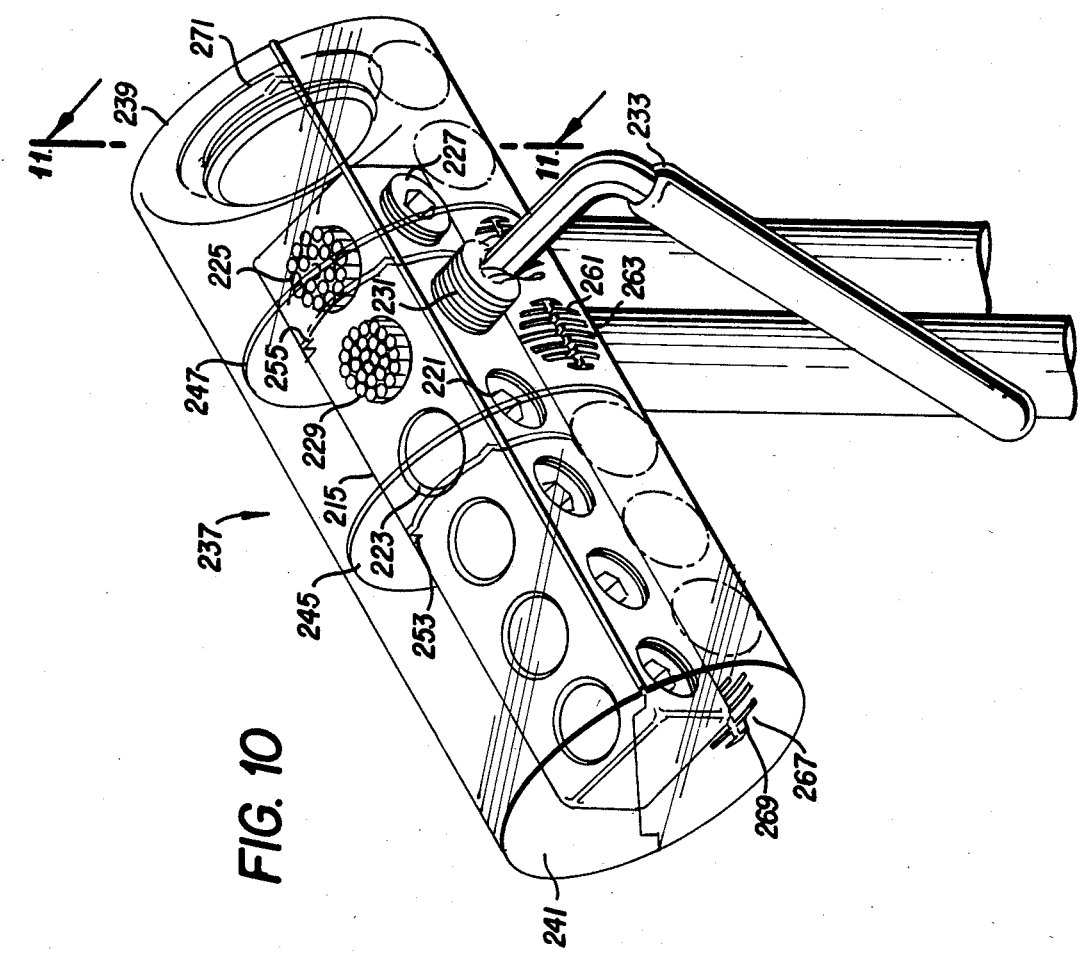
FIG. 10 is a further modification of the cover of FIG. 1 for use with pedestal bar connectors.

FIG. 10 is a further modification of the cover as shown in FIG. 1. The cover is modified so as to be used as an insulating device when a pedestal bar connector is used rather than the transformer bar connector.

Pedestals are metallic or fiberglass above ground enclosures commonly used as service cable distribution points in underground secondary voltage systems.

The standard pedestal bar connector is rectangular as shown in FIG. 10. However, it is to be understood that the present invention could be compatible with the other geometrical configuration such as a square bar connector, that is a connector wherein all sides are of an equal dimension. The standard pedestal bar connector has a plurality of threaded boreholes 221 which extend into the bar connector 215 and meet in centered alignment with the plurality of cable installation ports 223 which extend through the bar connector. In FIG. 10, cables 225 and 229 are shown in position in their respective installation ports. Set screw 227 has been secured so as to maintain cable 225 in position and, in the illustration, set screw 231 is being driven to a set position by wrench 233.

Translucent cover 237 comprises a housing which is closed at both end 239 and end 241. In the illustration shown, end 239 has a normal opening as described relative to FIG. 1 but is closed by means of cap 271 which will be described in detail as the description proceeds. This cover, with use of the cap, is preferably used so that the same mold may be used for making the above described transformer bar connector and may be easily adapted to use with a pedestal bar connector by providing the cap for closing the end having the existing hole. In this type of construction, in order for the protection to be totally provided, both ends of the cover must be closed. It is to be understood, however, that the cover could be molded so that both ends are similar to that illustrated at the closed end 241. This type of cover is acceptable since a pedestal bar connector may be placed within the cover when it is in its opened position whereafter the cover may be closed and secured.

A plurality of alignment ribs 245 and 247 are integral with housing 237 and extend transversely within the housing. Each of the alignment ribs includes apertures 253 and 255.

As will now be obvious, this cover, when in place, operates and functions in the very same manner as does the cover described relative to FIG. 1. Accordingly, further description of that particular operation will not be repeated.

In the periphery of housing 237 is a row of access ports 261 which extends in longitudinal alignment substantially along the entire length of the housing. These access ports have a plurality of opposed flexible tines 263 which extend from the periphery of each of the access ports in the same manner as the cover of FIG. 1.

Likewise, a second row of access ports 267, having opposed tines 269 extends in longitudinal alignment along substantially the entire length of the housing with the first and second rows of access ports being substantially parallel and being peripherally spaced from each other substantially 90° as in the cover of FIG. 1.

Figure 11:
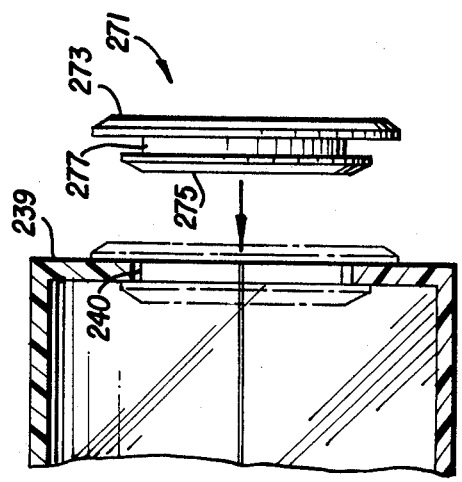
FIG. 11 is a partial sectional view taken through one end of the cover of FIG. 10 in the direction of the line 11—11.

FIG. 11 shows end 239 of the cover having opening 240 therein. In order to close this opening, a cap 271 is provided which has an outer face 273 substantially larger than the hole and an inner face 275 which is somewhat larger than the hole. Intermediate section 277 is designed so as to have the same geometrical configuration as the hole 240. The cap may be inserted after the cover is closed since the material from which the cap is made will give somewhat as the cap is pressed into place and will assume the configuration as shown in the dotted lines whereby inner face 275 is passed through the hole 240 and the edges of the opening return to their original position thus securing the cap into place. Alternately, the cap could be set in place while the cover is open so that both ends of the cover are closed when the sections of the cover are mated. Additionally, the cap could be secured to one of the sections by means such as an adhesive.

As will be evident, the cover as described in connection with FIGS. 10 and 11 gives the same protection for a pedestal bar connector as does the cover of FIG. 1 for a transformer bar connector.

It will now be apparent that the present invention provides a protective insulating cover which is adaptable to all standard installation techniques and at the same time provides not only the normal insulating feature for the operator but also the additional features of temporarily restraining cables and tools while the installation is taking place.

The above description and accompanying drawings are illustrative only since modifications of the housing could be made without departing from the scope of the present invention. It is particularly noted that the housing could be other than a round cross-sectional area, such as square, etc. Additionally, other aperture configurations in the ribs could be used to provide the support and rotation prevention functions. Accordingly, the invention is to be limited only by the scope of the following claims.

What is claimed is:

1. An insulator cover for an elongated pedestal bar connector having a plurality of spaced installation ports extending along the length thereof and extending therethrough at substantially right angles to the longitudinal axis of said pedestal bar connector, a plurality of internally threaded boreholes equal in number to said installation ports and extending from said ports to the exterior of said pedestal bar connector at substantially right angles to the axes of said ports; said cover comprising an elongated housing closed at one end and open at the other end;

a plurality of first and second substantially parallel rows of longitudinally aligned spaced access ports through the wall of said housing, said first row of access ports being peripherally spaced from said second row of access ports substantially ninety degrees;

the spacing between adjacent individual access ports being substantially the same as the spacing between said installation ports in said pedestal bar connector;

at least one alignment rib secured to and extending transversely within the interior of said housing;

aperture means in said alignment rib of a dimension to allow longitudinal passage of said pedestal bar connector therethrough whereby said access ports will be aligned with said installation ports and boreholes in said pedestal bar connector when the cover is assembled thereon; and removable cap means for covering the opening at said other end of said housing.

2. An insulator cover for an elongated pedestal bar connector having a plurality of spaced installation ports extending along the length thereof and extending therethrough at substantially right angles to the longitudinal axis of said pedestal bar connector, a plurality of internally threaded boreholes equal in number to said installation ports and extending from said ports to the exterior of said pedestal bar connector at substantially right angles to the axes of said ports, said cover comprising an elongated housing having opposed mating sections hinged longitudinally, both ends of said housing being closed when said sections are mated;

a plurality of first and second substantially parallel rows of longitudinally aligned spaced access ports through the wall of said housing, said first row of access ports being peripherally spaced from said second row of access ports substantially ninety degrees;

the spacing between adjacent individual access ports being substantially the same as the spacing between said installation ports in said pedestal bar connector;

at least one alignment rib secured to and extending transversely within the interior of said housing;

aperture means in said alignment rib of a dimension so as to support said pedestal bar connector within said housing whereby said access ports will be aligned with said installation ports and boreholes in said pedestal bar connector when the cover is assembled thereon.

* * * * *